United States Patent
Yasui

(10) Patent No.: US 8,161,202 B2
(45) Date of Patent: Apr. 17, 2012

(54) PERIPHERAL DEVICE MANAGEMENT SYSTEM

(75) Inventor: Ryo Yasui, Nagoya (JP)

(73) Assignee: Brother Kogyo Kabushiki Kaisha, Aichi-Ken (JP)

(*) Notice: Subject to any disclaimer, the term of this patent is extended or adjusted under 35 U.S.C. 154(b) by 125 days.

(21) Appl. No.: 12/548,949

(22) Filed: Aug. 27, 2009

(65) Prior Publication Data

US 2010/0082847 A1  Apr. 1, 2010

(30) Foreign Application Priority Data

Sep. 29, 2008  (JP) .................................. 2008-250756

(51) Int. Cl.
*G06F 3/00* (2006.01)
*G06F 9/45* (2006.01)

(52) U.S. Cl. .............. 710/15; 710/6; 717/168; 717/172; 717/173; 718/102; 718/103

(58) Field of Classification Search .......................... None
See application file for complete search history.

(56) References Cited

U.S. PATENT DOCUMENTS

| | | | |
|---|---|---|---|
| 5,491,535 A | 2/1996 | Hirata et al. | |
| 2005/0144616 A1* | 6/2005 | Hammond et al. | 717/173 |
| 2008/0148268 A1* | 6/2008 | Hirouchi | 718/103 |

FOREIGN PATENT DOCUMENTS

| | | |
|---|---|---|
| JP | H04-88358 | 3/1992 |
| JP | 2001-216115 | 8/2001 |
| JP | 2003-140907 | 5/2003 |
| JP | 2003-186638 | 7/2003 |
| JP | 2004-110396 | 4/2004 |
| JP | 2008-15794 | 1/2008 |

OTHER PUBLICATIONS

Japanese Office Action dated Jun. 8, 2010 with English translation.

* cited by examiner

*Primary Examiner* — Eron J Sorrell
*Assistant Examiner* — Dean Phan
(74) *Attorney, Agent, or Firm* — Scully, Scott, Murphy & Presser, P.C.

(57) ABSTRACT

The peripheral device management system includes a server, a peripheral device, a data processing device. The data processing device includes an attempting unit, a confirming unit, a notifying unit, a first setting unit, and a second setting unit. The attempting unit attempts to acquire, from the peripheral device, firmware data. The confirming unit confirms, to the server, whether a newer firmware than the firmware installed on the peripheral device is available for downloading from the server. The notifying unit notifies that the newer firmware is available for downloading from the server. The first setting unit sets a first confirmation time as the confirmation time if a result of the attempting unit satisfies a prescribed condition. The second setting unit sets a second confirmation time that precedes the first confirmation time as the confirmation time if the result of the attempting unit does not satisfy the prescribed condition.

17 Claims, 7 Drawing Sheets

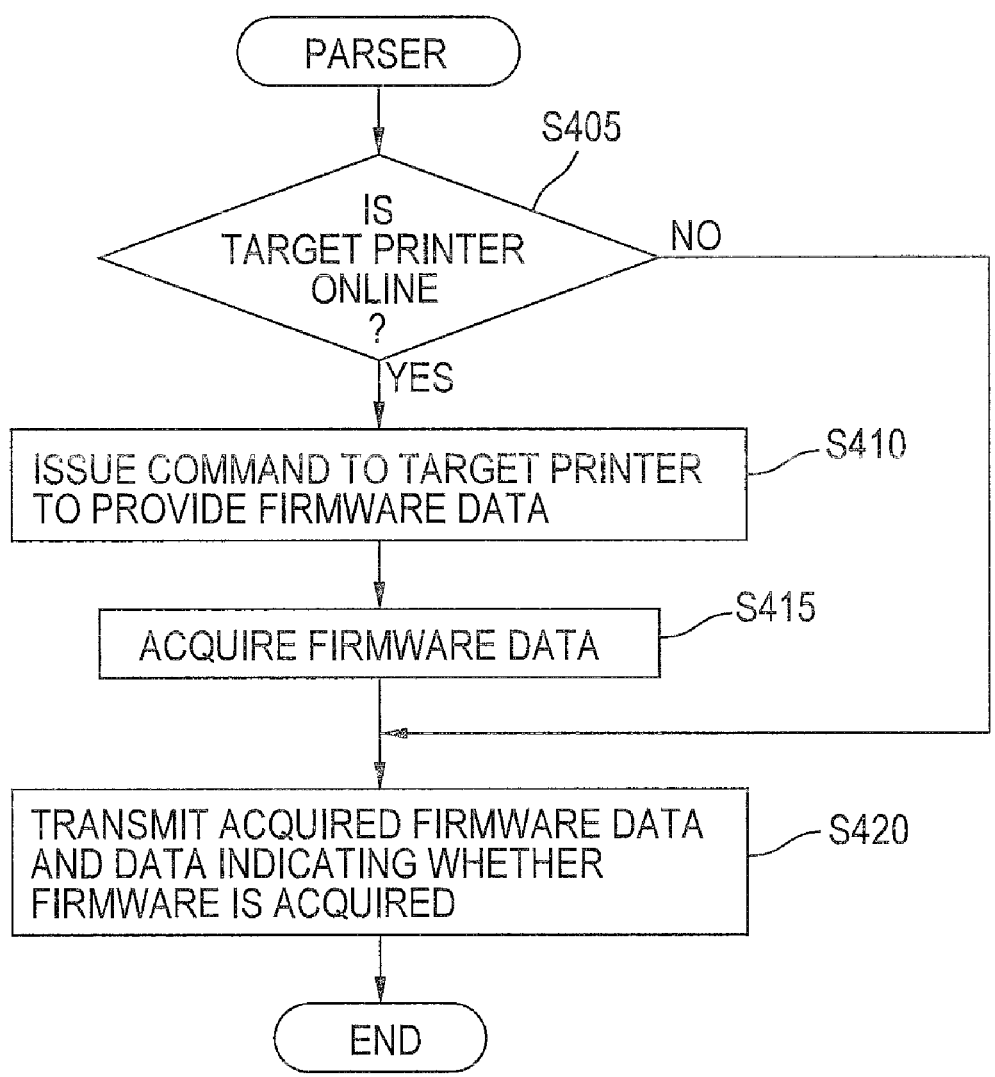

FIG.7(a)

| PRINTER NAME | PREVIOUS CHECK DATE | CHECKING INTERVAL |
|---|---|---|
| A | 7/30/2008 | 30 DAYS |
| B | 7/30/2008 | 30 DAYS |
| C | 7/30/2008 | 30 DAYS |
| D | 7/30/2008 | 30 DAYS |
| E | 7/30/2008 | 30 DAYS |

FIG.7(b)

| PRINTER NAME | PREVIOUS CHECK DATE | CHECKING INTERVAL |
|---|---|---|
| A | 9/2/2008 | 30 DAYS |
| B | 9/2/2008 | 2 DAYS |
| C | 9/2/2008 | 60 DAYS |
| D | 9/2/2008 | 2 DAYS |
| E | 9/2/2008 | 2 DAYS |

FIG.7(c)

| PRINTER NAME | PREVIOUS CHECK DATE | CHECKING INTERVAL |
|---|---|---|
| A | 9/4/2008 | 30 DAYS |
| B | 9/4/2008 | 30 DAYS |
| C | 9/4/2008 | 60 DAYS |
| D | 9/4/2008 | 2 DAYS |
| E | 9/4/2008 | 60 DAYS |

FIG.7(d)

| PRINTER NAME | PREVIOUS CHECK DATE | CHECKING INTERVAL |
|---|---|---|
| A | 9/7/2008 | 30 DAYS |
| B | 9/7/2008 | 30 DAYS |
| C | 9/7/2008 | 60 DAYS |
| D | 9/7/2008 | 60 DAYS |
| E | 9/7/2008 | 60 DAYS |

FIG.7(e)

| PRINTER NAME | PREVIOUS CHECK DATE | CHECKING INTERVAL |
|---|---|---|
| A | 9/7/2008 | 30 DAYS |
| B | 9/7/2008 | 30 DAYS |
| C | 9/7/2008 | 30 DAYS |
| D | 9/7/2008 | 30 DAYS |
| E | 9/7/2008 | 30 DAYS |

PERIPHERAL DEVICE MANAGEMENT SYSTEM

CROSS REFERENCE TO RELATED APPLICATION

This application claims priority from Japanese Patent Application No. 2008-250756 filed Sep. 29, 2008. The entire content of each of the priority application is incorporated herein by reference.

TECHNICAL FIELD

The invention relates to a peripheral device management program and a peripheral device management system.

BACKGROUND

Technologies for updating firmware in peripheral devices are well known in the art. With these technologies, a client computer can check whether the version of the latest firmware for a printer provided on the Web site of the printer manufacturer, for example, is newer than the version of firmware currently installed on the printer. The client computer may execute a prescribed process for updating the firmware in a printer, for example, when the latest firmware is newer than the existing version.

SUMMARY

However, the client computer may not always be able to communicate with peripheral devices on a network. For example, the power of a network peripheral may not always be on, and, even when the power is on, the network peripheral may be offline. Accordingly, the client computer cannot always acquire version data for firmware from the peripheral devices at the desired timing and, thus, sometimes fail when attempting to check the firmware version.

In view of the foregoing, it is an object of the invention to provide a peripheral device management system capable of acquiring firmware data from a peripheral device at a suitable timing after failing to acquire firmware data from the peripheral device.

In order to attain the above and other objects, the invention provides a computer-readable storage medium storing a set of program instructions executable on a data processing device communicable with a server and a peripheral device on which a firmware is installed. The program instructions includes (a) determining whether a confirmation time has come, (b) attempting to acquire, from the peripheral device, firmware data that specifies the firmware installed on the peripheral device if a result of the determination made in the determining instruction (a) is affirmative, (c) confirming, to the server, whether a newer firmware than the firmware installed on the peripheral device is available for downloading from the server if the attempting instruction (b) successfully acquires the firmware data, (d) notifying that the newer firmware is available for downloading from the server if a result of the confirmation made in the confirmation instruction (c) is affirmative, (e) setting a first confirmation time as the confirmation time if a result of the attempting instruction (b) satisfies a prescribed condition, and (f) setting a second confirmation time that precedes the first confirmation time as the confirmation time if the result of the attempting instruction (b) does not satisfy the prescribed condition.

According to another aspect, the invention provides a peripheral device management system. The peripheral device management system includes a server, a peripheral device, a data processing device. A firmware is installed in the peripheral device. The data processing device is communicable with the server and the peripheral device. The data processing device includes a determining unit, an attempting unit, a confirming unit, a notifying unit, a first setting unit, and a second setting unit. The determining unit determines whether a confirmation time has come. The attempting unit attempts to acquire, from the peripheral device, firmware data that specifies the firmware installed on the peripheral device if a result of the determination made by the determining unit is affirmative. The confirming unit confirms, to the server, whether a newer firmware than the firmware installed on the peripheral device is available for downloading from the server if the attempting unit successfully acquires the firmware data. The notifying unit notifies that the newer firmware is available for downloading from the server if a result of the confirmation made by the confirmation unit is affirmative. The first setting unit sets a first confirmation time as the confirmation time if a result of the attempting unit satisfies a prescribed condition. The second setting unit sets a second confirmation time that precedes the first confirmation time as the confirmation time if the result of the attempting unit does not satisfy the prescribed condition.

According to still another aspect, the invention provides a method for controlling a data processing device communicable with a server and a peripheral device on which a firmware is installed. The method includes steps of (a) determining whether a confirmation time has come, (b) attempting to acquire, from the peripheral device, firmware data that specifies the firmware installed on the peripheral device if a result of the determination made in the determining step (a) is affirmative, (c) confirming, to the server, whether a newer firmware than the firmware installed on the peripheral device is available for downloading from the server if the attempting step (b) successfully acquires the firmware data, (d) notifying that the newer firmware is available for downloading from the server if a result of the confirmation made in the confirmation step (c) is affirmative, (e) setting a first confirmation time as the confirmation time if a result of the attempting step (b) satisfies a prescribed condition, and (f) setting a second confirmation time that precedes the first confirmation time as the confirmation time if the result of the attempting step (b) does not satisfy the prescribed condition.

BRIEF DESCRIPTION OF THE DRAWINGS

The particular features and advantages of the invention as well as other objects will become apparent from the following description taken in connection with the accompanying drawings, in which:

FIG. 6 is a flowchart illustrating a process executed by a parser;

FIG. 7($a$) is an initial state of data set stored in history data;

FIG. 7($b$) is a state of the data set that is subsequent to the state shown in FIG. 7($a$);

FIG. 7(c) is a state of the data set that is subsequent to the state shown in FIG. 7(b);

FIG. 7(d) is a state of the data set that is subsequent to the state shown in FIG. 7(c); and FIG. 7(e) is another state of the data set that is subsequent to the state shown in FIG. 7(c).

DETAILED DESCRIPTION

A peripheral device management system 100 according to embodiments of the invention will be described while referring to the accompanying drawings.

[Overall Structure of the Peripheral Device Management System]

Figure 1:
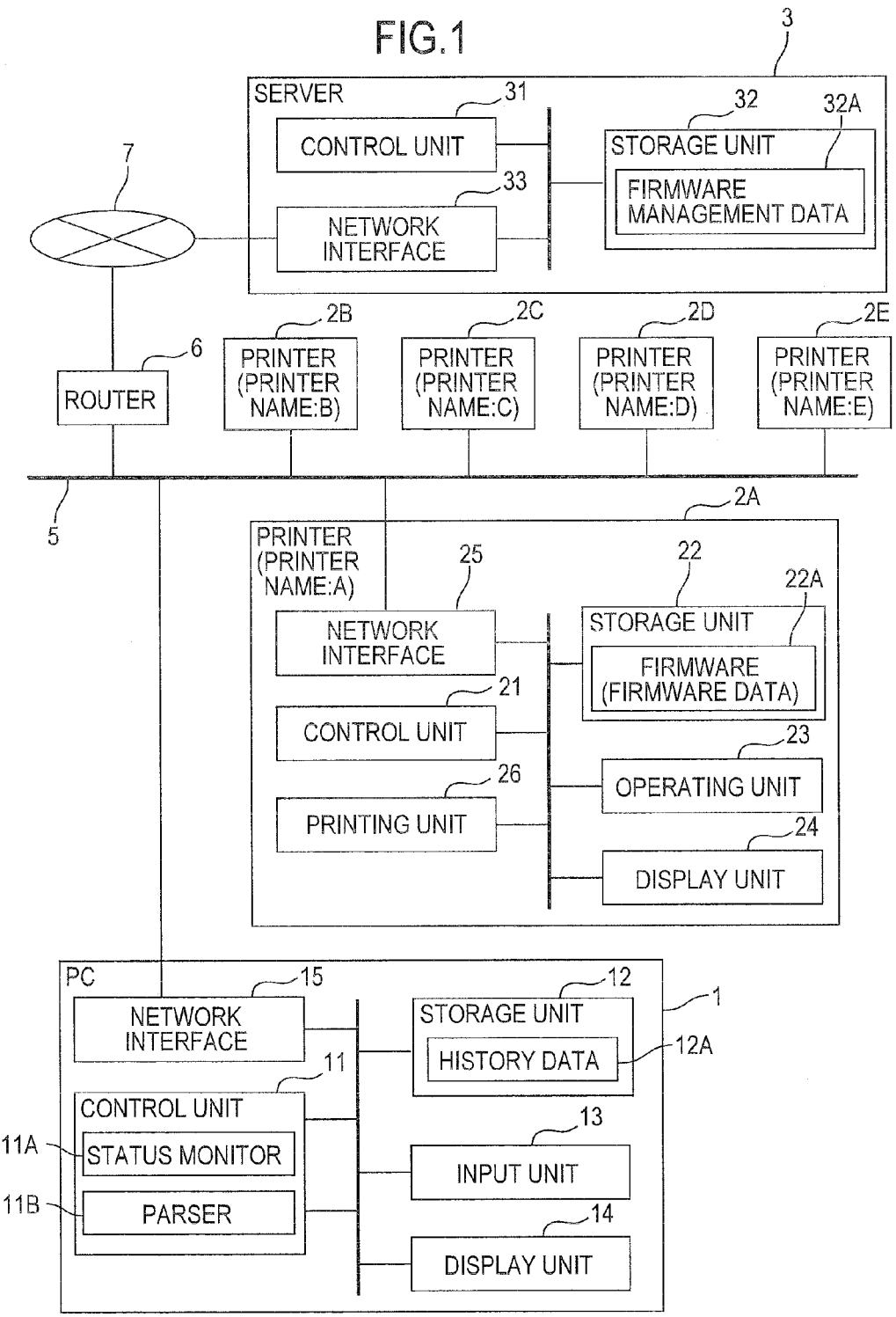
FIG. 1 is a block diagram showing an overall structure of a peripheral device management system.

FIG. 1 is a block diagram showing the overall structure of the peripheral device management system 100. In the embodiment, the peripheral device management system 100 includes a personal computer 1 (hereinafter abbreviated as "PC 1"), a plurality of printers 2A-2E, and a server 3.

The PC 1 is capable of communicating with the printers 2A-2E via a local area network (LAN) 5. The LAN 5 is connected to a wide area network (WAN) 7, such as the Internet, via a router 6. The PC 1 can communicate with the server 3 via the WAN 7.

The PC 1 includes a control unit 11, a storage unit 12, an input unit 13, a display unit 14, and a network interface 15.

The control unit 11 is configured of hardware that includes a CPU, ROM, and RAM; and software that includes an operating system (OS) and various applications. Software in the control unit 11 related to the peripheral device management system 100 of the embodiment includes a status monitor 11A, and a parser 11B.

The status monitor 11A implements a process for providing notifications to the user by outputting to the display unit 14 various data related to the printers 2A-2E. The status monitor 11A also implements a process for receiving data inputted by the user.

The parser 11B implements a process for outputting commands to the printers 2A-2E in a format based on the Printer Job Language (PJL) and for acquiring the various data outputted by the printers 2A-2E upon receiving these commands. The parser 11B also implements a process to parse data acquired from the printers 2A-2E, convert this data to a data format that the status monitor 11A can reference, and output the converted data to the status monitor 11A.

The storage unit 12 is provided separately from the RAM in the control unit 11 and is configured of a hard disk drive or a nonvolatile memory having a larger capacity than the RAM. The storage unit 12 functions to store data of a relatively large size and data that is preferably preserved when the power supply is interrupted. In the embodiment, the storage unit 12 stores history data 12A related to firmware updates for the printers 2A-2E. Further, the storage unit 12 stores programs executing processes shown in FIG. 36.

The printer 2A includes a control unit 21, a storage unit 22, an operating unit 23, a display unit 24, a network interface 25, and a printing unit 26.

The storage unit 22 is configured of nonvolatile memory and stores firmware 22A for controlling hardware provided in the printer 2A, and data related to this firmware (version data and the like, hereinafter referred to as "firmware data").

Since the internal structures of the other printers 2B-2E are identical to that of the printer 2A, only the internal structure of the printer 2A is shown in FIG. 1.

The server 3 includes a control unit 31, a storage unit 32, and a network interface 33.

The storage unit 32 is configured of a large capacity hard disk drive and functions to store, among other data, firmware management data 32A concerning printer firmware that can be distributed by the server 3. The firmware management data 32A includes version data for the latest firmware.

The server 3 includes a function for transmitting printer firmware in response to a request from a client computer. The storage unit 32 also stores the printer firmware (not shown) that can be distributed. However, the peripheral device management system 100 described in the embodiment is a system for transmitting to the PC 1 data related to firmware that can be distributed by the server 3 and is separate from a system for distributing the printer firmware itself.

Figure 2:
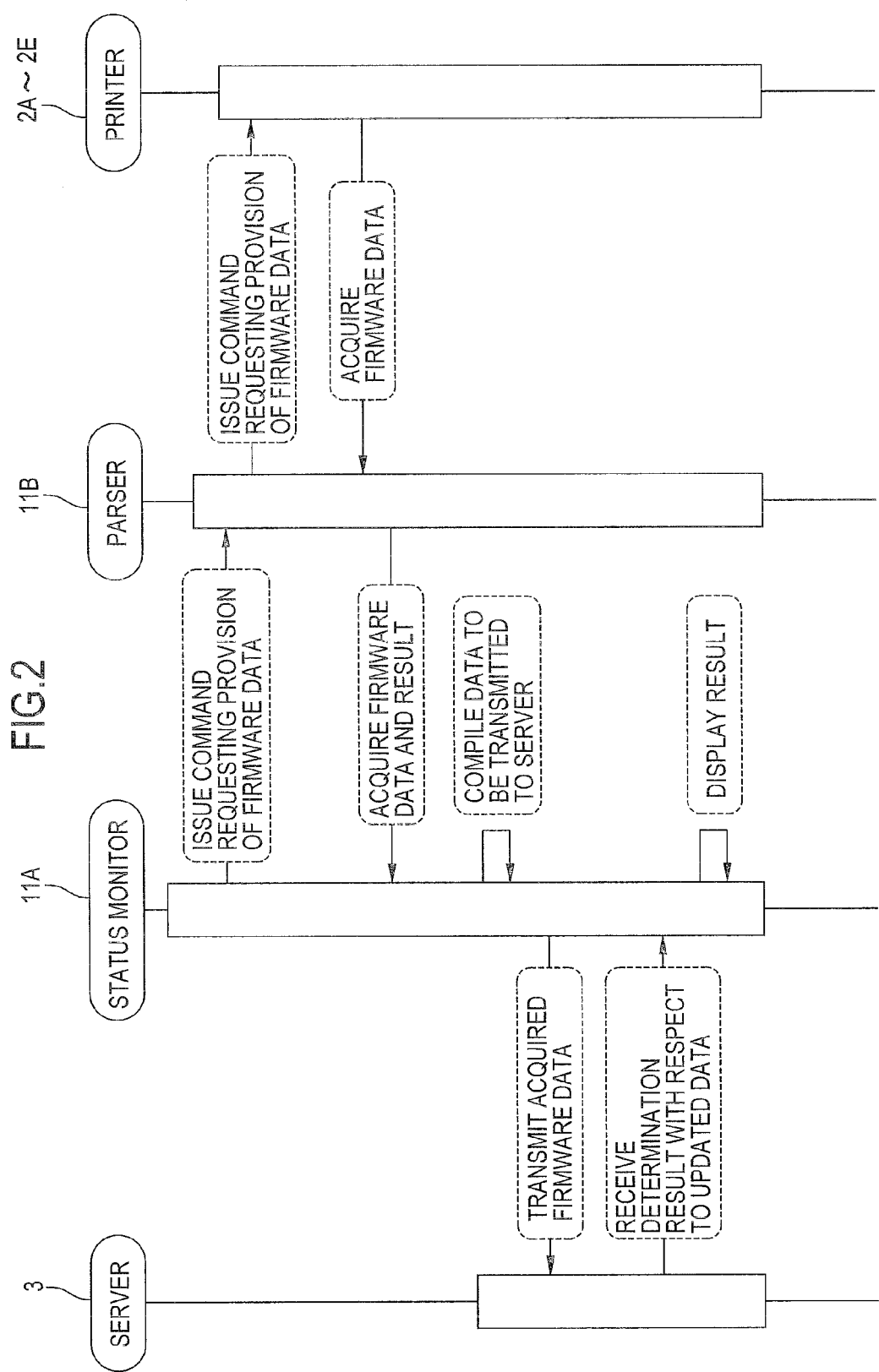
FIG. 2 is a block diagram showing transmission paths along which data is exchanged within the peripheral device management system.

FIG. 2 is a block diagram showing transmission paths along which data is exchanged within the peripheral device management system 100. In the peripheral device management system 100 having this construction, the status monitor 11A issues a command to the parser 11B requesting the provision of firmware data. The parser 11B relays this command to the printers 2A-2E that are currently online, and the corresponding printers 2A-2E return firmware data to the parser 11B upon receiving the command. Subsequently, the parser 11B transmits this firmware data and the results of acquiring the data (i.e., whether acquisition has been successful) to the status monitor 11A.

If any of the printers 2A-2E are not online (for example, if a printer is offline or the power to the printer is off), the parser 11B cannot relay the command to these printers. Since the parser 11B cannot acquire firmware data from these printers in this case, the parser 11B simply transfers acquisition results (data indicating that acquisition has been failed) for these printers to the status monitor 11A.

After acquiring the firmware data through this process, the status monitor 11A compiles data to be transmitted to the server 3 and transmits the acquired firmware data altogether to the server 3. Based on the data transmitted from the status monitor 11A, the server 3 determines whether a newer version of firmware is available and transmits the results of this determination to the status monitor 11A.

Upon receiving the determination results from the server 3, the status monitor 11A determines whether the firmware for the printer can be updated and, if so, notifies the user of the PC 1 by displaying a message on the display unit 14.

Since the user of the PC 1 can recognize that the firmware for one or more of the printers 2A-2E can be updated based on this notification, the user can subsequently instruct the PC 1 to download and update the firmware.

Hence, the peripheral device management system 100 of the embodiment implements a process for notifying the user of the PC 1 when firmware can be updated, but the user can freely decide whether to execute an operation to actually download and update the firmware.

[Processes Implemented by the Status Monitor and Parser]

Next, processes implemented by the status monitor 11A and the parser 11B to achieve the peripheral device management system 100 described above will be described based on the flowcharts in FIGS. 3 through 6.

The following process is performed when the status monitor 11A is launched on the PC 1. The event that triggers launching of the status monitor 11A may be arbitrarily set. For example, the status monitor 11A may be started as a separate process from a printer driver (not shown) while the printer driver is executing printing-related processes to output data for printing on the printers 2A-2E. Further, the status monitor 11A may be launched when the PC 1 is started up or may be launched manually through a user operation.

Figure 3:
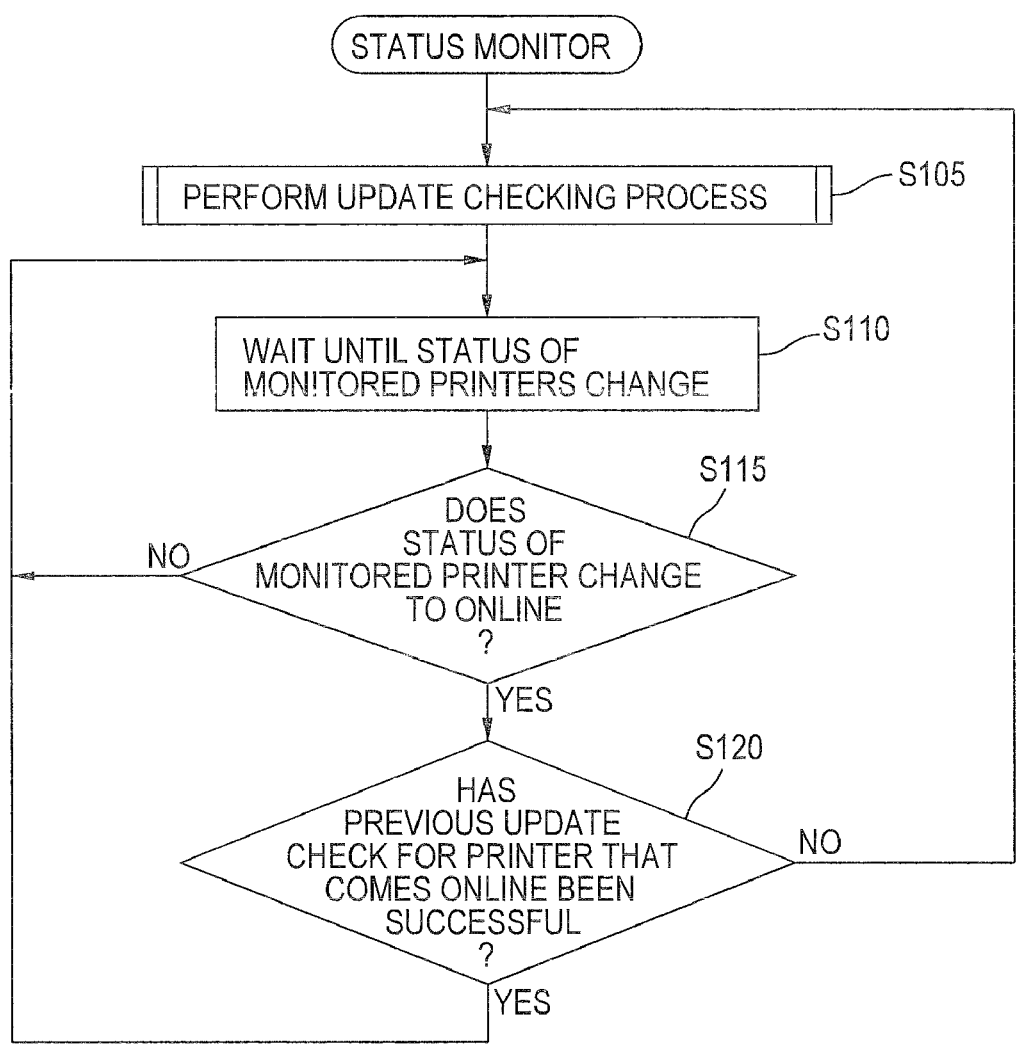
FIG. 3 is a flowchart illustrating a process executed by a status monitor.

When the status monitor 11A is launched, the PC 1 begins executing the process shown in FIG. 3 as the status monitor 11A (the following description refers to the status monitor 11A though strictly speaking the PC 1 is functioning as the status monitor 11A). In S105 the status monitor 11A performs a process to check for updates for firmware installed on the printers 2A-2E. This process will be described next in greater detail with reference to FIG. 4.

Figure 4:
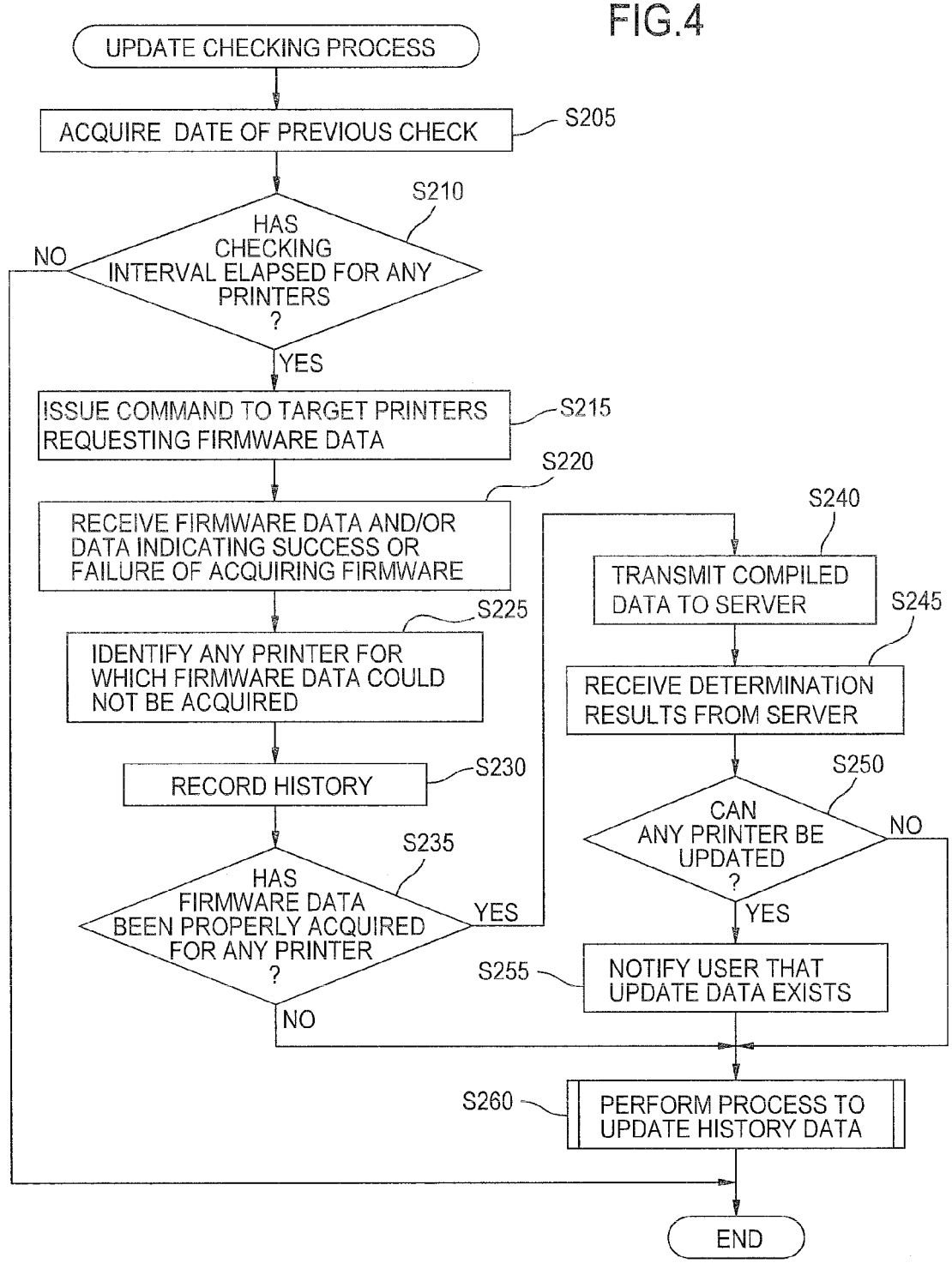
FIG. 4 is a flowchart illustrating an update checking process.

In S205 at the beginning of the update checking process shown in FIG. 4, the status monitor 11A acquires the date of the previous check. In the embodiment, the history data 12A stored in the storage unit 12 includes a dataset for each of the printers 2A-2E. Each dataset includes a printer name, a previous check date, and a checking interval, as illustrated in the examples of FIGS. 7(a)-7(e). While not shown in the drawings, the history data 12A also includes the dates and times that the status monitor 11A attempted to acquire firmware data from each printer and data indicating whether each attempted acquisition was successful and includes on a cumulative value that includes the number of printers from which firmware data was successfully acquired in the past.

Each dataset listed with the corresponding printer name A-E in the history data 12A is a dataset corresponding to one of the printers 2A-2E. However, since the same date is stored as the "previous check date" for all printers, in S205 the status monitor 11A reads this previous check date from any dataset in the history data 12A.

After acquiring the previous check date, in S210 the status monitor 11A determines whether the checking interval has elapsed for any printers. Specifically, the status monitor 11A reads the checking interval in the history data 12A for each dataset corresponding to the printers 2A-2E and determines whether the checking interval has elapsed for any printer by comparing a date obtained by adding the checking interval to the previous check date with the current date. The status monitor 11A also uses the history data to select only printers having a low failure rate among those printers from which the status monitor 11A failed to acquire firmware data in the previous update check to be targeted for the current process. This point will be described later in greater detail using specific examples with reference to FIGS. 7(a)-7(e).

If the checking interval has not elapsed for any printers (S210: NO), the status monitor 11A ends the update checking process shown in FIG. 4. However, if the checking interval has elapsed for a printer (S210: YES), the status monitor 11A advances to S215.

In S215 the status monitor 11A issues a command to the target printers (the printers for which the checking interval has elapsed) requesting firmware data. When executing the process in S215, the status monitor 11A launches the parser 11B as a separate process. Accordingly, the parser 11B (strictly speaking, the PC 1 functioning as the parser 11B) begins a parsing process shown in FIG. 6.

In S405 at the beginning of the parsing process shown in FIG. 6, the parser 11B determines whether the target printer(s) is online. If the target printer(s) is online (S405: YES), in S410 the parser 11B issues a command(s) to the target printer to provide firmware data. This command(s) is transferred to the target printer(s) via the network interface 25 provided in the PC 1.

Upon receiving the command(s), the target printer(s) provides firmware data including version data to the PC 1. Accordingly, in S415 the parser 11B acquires this firmware data. However, if the parser 11B determines that the target printer is not online (S405: NO), the parser 11B skips S410 and S415 and jumps to S420.

After acquiring firmware data in S415 or after jumping from S405, in S420 the parser 11B transmits the acquired firmware data (if firmware data has been acquired) and data indicating whether firmware data has been acquired to the status monitor 11A through inter-process communication. Subsequently, the parser 11B ends the parsing process of FIG. 6.

As a result of the above parsing process executed on the PC 1, the parser 11B transmits firmware data and/or data indicating the success or failure of acquiring this firmware data from the target printer to the status monitor 11A. Accordingly, in S220 the status monitor 11A receives this data.

In S225 the status monitor 11A identifies any printer for which firmware data could not be acquired from among all target printers based on the received data. In S230 the status monitor 11A records data indicating the acquisition status of firmware data for the target printers in the history data 12A as the history.

In S235 the status monitor 11A determines whether firmware data has been properly acquired for any printer in the step S220. If firmware data could not be properly acquired for any printer (S235: NO), the status monitor 11A advances to S260, which will be described later in greater detail. However, if firmware data has been properly acquired for a printer in the step S220 (S235: YES), the status monitor 11A advances to S240.

In S240 the status monitor 11A complies data on printers for which firmware data has been properly acquired and transmits this data to the server 3. Upon receiving this data, the server 3 executes a process to determine whether the server 3 has newer firmware that can be provided to the PC 1 by referencing the firmware management data 32A stored in the storage unit 32 and transmits the results of this determination to the PC 1.

In S245 the status monitor 11A receives the determination results from the server 3 and in S250 determines based on these results whether any printer can be updated.

If the status monitor 11A determines that any of the printers can be updated (S250: YES), in S255 the status monitor 11A notifies the user of the PC 1 that update data exists and advances to S260. If the status monitor 11A determines that there are no printers to be updated (S250: NO), the status monitor 11A skips S255 and advances directly to S260. In S260 the status monitor 11A performs a process to update the history data. The process to update history data is shown in greater detail in FIG. 5.

Figure 5:
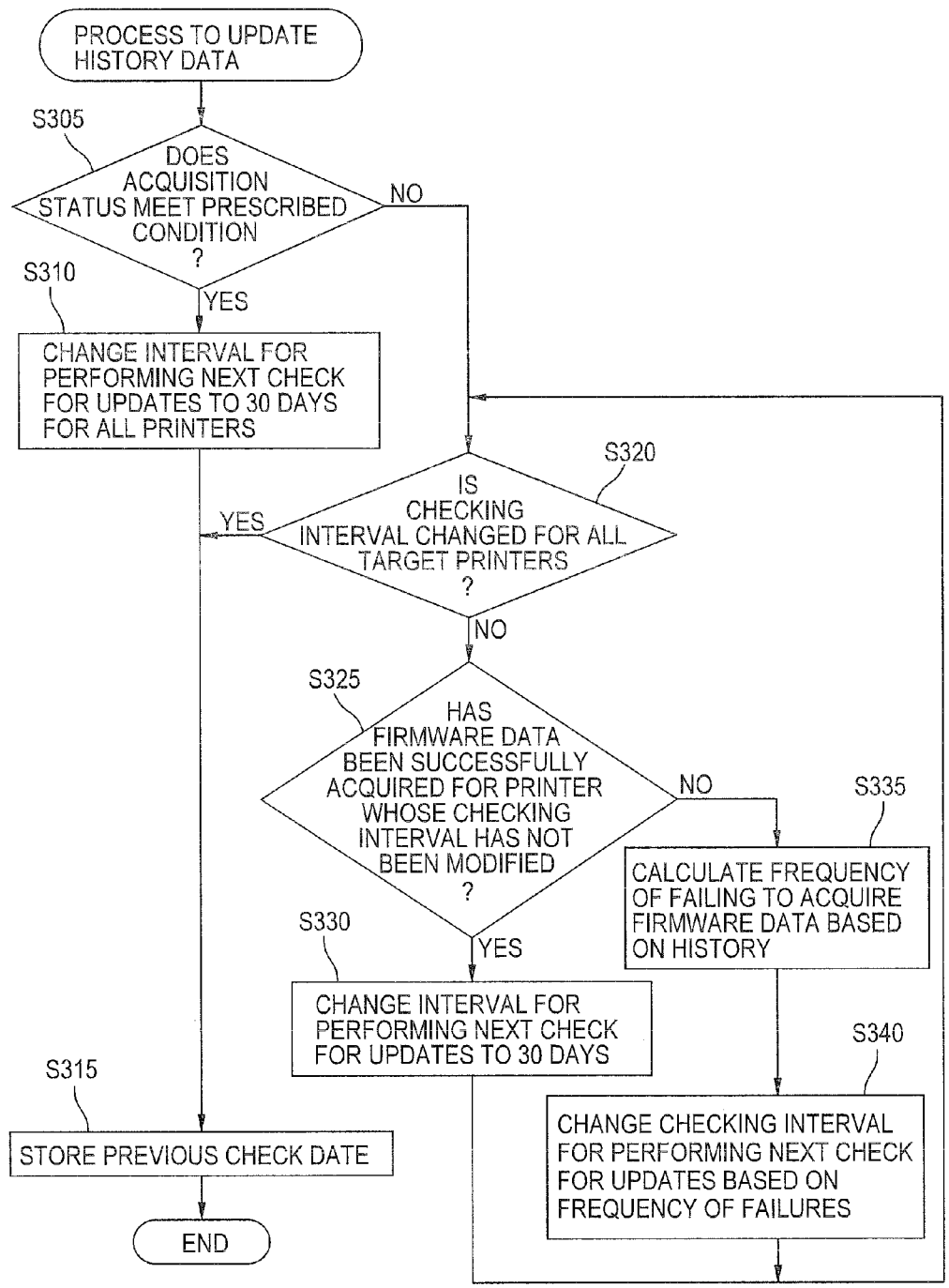
FIG. 5 is a flowchart illustrating a process to update history data.

In S305 at the beginning of the process to update history data shown in FIG. 5, the status monitor 11A determines whether the acquisition status meets a prescribed condition. In the embodiment, the prescribed condition is that firmware data has been properly acquired from at least a prescribed number of printers.

Thus, if firmware data has been properly acquired from at least the prescribed number of printers, in S305 the status monitor 11A determines that the acquisition status meets the prescribed condition. If firmware data has not been properly acquired from at least the prescribed number of printers (e.g., if firmware data has only been properly acquired from a number of printers less than the prescribed number), in S305 the status monitor 11A determines that the acquisition status does not meet the prescribed condition. That is, the prescribed condition is to acquire firmware data from a prescribed number of printers.

In the embodiment, the prescribed number used in S305 is set to the number of printers from which data is most frequently acquired successfully in one execution of the steps S215 through S220. For example, if the printers 2A-2C are generally online at all times and the printers 2D and 2E are frequently turned off, then normally firmware data is successfully acquired from three printers. In this case, the prescribed number used in S305 is set to "3" based on this updated history data 12A.

Thus, when the status monitor 11A determines in S305 that the acquisition status meets this prescribed condition (S305: YES), in S310 the status monitor 11A changes the interval for performing the next check for updates to 30 days for all printers. In S315 the status monitor 11A stores the current date in the history data 12A as the previous check date that is used for next update checking process and subsequently ends the process to update history data in FIG. 5.

However, if the status monitor 11A determines in S305 that the acquisition status does not meet the prescribed condition (S305: NO), the status monitor 11A repeats the process in S320-S340 for all printers.

More specifically, in S320 the status monitor 11A determines whether the checking interval has been changed for all target printers. If the checking interval has not been changed for all target printers (S320: NO), in S325 the status monitor 11A determines whether firmware data has been successfully acquired for a printer whose checking interval has not been changed.

If the status monitor 11A determines that firmware data has been successfully acquired for such a printer (S325: YES), in S330 the status monitor 11A changes the checking interval for performing the next check for updates to 30 days for the printer in question and returns to S320.

However, if there are no printers for which printer data has been successfully acquired (S325: NO), in S335 the status monitor 11A calculates the frequency of failing to acquire firmware data for the printers in question based on their history. In S340 the status monitor 11A changes the checking interval for performing the next check for updates based on the frequency of failures and subsequently returns to S320.

Here, a specific example will be given for the process in S335-S340. If the history data 12A indicates that attempts to acquire firmware data from the printer 2C succeeded nine times and failed once, the failure rate is approximately 10 percent, indicating a relatively high probability for successfully acquiring firmware data from the printer 2C.

Since one can expect a high probability of success when reattempting to acquire firmware data in this case after waiting a short time interval, in S340 the status monitor 11A changes the checking interval for the next check for updates to 2 days in S340.

However, if the history data 12A indicates that acquiring firmware from the printer 2E succeeded once and failed nine times, then the failure rate is about 90 percent, indicating a relatively high probability that a subsequent attempt to acquire the firmware data will fail.

In this case, one can expect a high probability of failure when attempting again to acquire firmware data after waiting a short time interval. Therefore, in S340 the status monitor 11A changes the checking interval for the next check for updates to 60 days.

In other words, if the history data 12A indicates that a rate of the success for acquiring the firmware data is greater than or equal to a prescribed late, the status monitor 11A sets the checking interval for the next check for updates to 2 days that is shorter than the 30 days. Whereas if the history data 12A indicates that the rate of the success for acquiring the firmware data is smaller than the prescribed late, the status monitor 11A sets the checking interval for the next check for updates to 60 days that is longer than the 30 days.

When changing the interval for the next update check according to the method described above, even if the status monitor 11A fails to acquire firmware data from a printer when the probability of successfully acquiring firmware data is high, the next timing for checking for updates will arrive relatively quickly. Further, this method can reduce excessive processing load on the PC 1 by not unnecessarily increasing the number of opportunities for the status monitor 11A to fail to acquire firmware data from printers for which the probability of failure to acquire firmware data is high.

When the checking interval has been changed for all target printers after repeatedly performing the process described above in S320-S340 targeting each of the printers (S320: YES), in S315 the status monitor 11A records the current date in the history data 12A as the previous check date, as described above, and subsequently ends the process to update history data in FIG. 5.

After completing the process to update history data in FIG. 5 and consequently completing the process in S260 of FIG. 4, the status monitor 11A ends the update checking process shown in FIG. 4. Further, by completing the update checking process shown in FIG. 4, the status monitor 11A has completed the process in S105 shown in FIG. 3 and subsequently advances to S110.

In S110 the status monitor 11A waits until the status of monitored printers changes. When the status of one of the monitored printers changes, in S115 the status monitor 11A determines whether the status of the monitored printer changed to "online."

Here, monitored printers are those printers whose status the status monitor 11A monitors for changes. For example, all printers on the network may be set as monitored printers, or the user may specify which printers to monitor. Alternatively, the status monitor 11A may set the monitored printers to be those printers identified in S225 as printers for which firmware data could not be acquired.

If the status monitor 11A determines in S115 that the status of any monitored printer has not changed to "online" (S115: NO), the status monitor 11A returns to S110 and reenters the wait state. However, if the status of a monitored printer has changed to "online" (S115: YES), in S120 the status monitor 11A determines whether the previous update check for the printer that comes online was successful by referencing the history data 12A.

If the previous update check was successful for the printer that comes online (S120: YES), the status monitor 11A returns to S110 and re-enters the wait state. However, if the previous update check for the printer that came online failed (S120: NO), then the status monitor 11A returns to S105 and performs the process to check for updates. Since the process executed in S105 is described earlier in detail, a description of this process will not be repeated here.

[Specific Examples for Update Checking Intervals]

Next, the manner in which the checking intervals corresponding to the printers 2A-2E change by executing the above process will be described while referring to the specific cases shown in FIGS. 7(a)-7(e).

FIG. 7(a) shows the initial status of the datasets stored in the history data 12A for each of the printers 2A-2E. In this initial state, the previous check date is set to "7/30/2008" and the checking interval is set to "30 days" for all of the printers 2A-2E. If the current date is "9/2/2008", then the status monitor 11A reaches a positive determination in S210 described above.

In this example, it will be assumed that the status monitor 11A has successfully acquired firmware data from the printer 2A, but has been unable to acquire firmware data from the printers 2B and 2C. Consequently, the status monitor 11A reaches a negative determination in S305.

That is, in the embodiment the status monitor 11A determines in S305 that the prescribed condition is met when the status monitor 11A has been able to acquire firmware data from three or more printers. Hence, despite acquiring firmware data from the printer 2A, the status monitor 11A reaches a negative determination in S305 because firmware data has been acquired from less than three printers.

As a result, the status monitor 11A branches to the S320 side of the flowchart in FIG. 5 from S305 and changes the checking interval for the printer 2A in S330 to "30 days." It will be assumed at this point that firmware data has been successfully acquired from the printers 2B, 2D, and 2E with high frequency. Accordingly, in S340 the status monitor 11A changes the checking interval for these printers 2B, 2D, and 2E to "2 days."

It will also be assumed at this point that firmware data has been successfully acquired from the printer 2C with low frequency. Accordingly, in S340 the status monitor 11A changes the checking interval for the printer 2C to "60 days."

Through this process, the checking intervals for the printers 2A-2E have now been changed to the days shown in FIG. 7(b). Further, the previous check date is also updated to the same date for all printers 2A-2E, regardless of whether firmware data is successfully acquired from the printers.

Next, when the current date reaches "9/4/2008", the status monitor 11A reaches a positive determination in S210 for the printers 2B, 2D, and 2E. In this example, it will be assumed that the status monitor 11A successfully acquires firmware data from the printer 2B, but fails to acquire firmware data from the printers 2D and 2E. Consequently, the status monitor 11A reaches a negative determination in S305. That is, in the embodiment, the status monitor 11A determines in S305 that the prescribed condition is met only when firmware data has been acquired from three or more printers, as described above.

The number of printers from which firmware data has been successfully acquired is determined based on a cumulative value that includes the number of printers from which firmware data was successfully acquired in the past. In the example described above, the status monitor 11A previously acquired firmware data from the printer 2A. Since the status monitor 11A acquires firmware data from the printer 2B in the present attempt, the number of printers from which firmware data has been successfully acquired is now two.

However, since the status monitor 11A determines in S305 that the prescribed condition is met when firmware data has been acquired from at least three printers, as described above, the status monitor 11A reaches a negative determination in S305 at this time because firmware data has been acquired from only the two printers 2A and 2B, which is less than the required three printers.

As a result, the status monitor 11A again branches to the S320 side of the flowchart in FIG. 5 and in S330 changes the checking interval to "30 days" for the printer 2B. Further, this example assumes that firmware data has been successfully acquired from the printer 2D with high frequency. Therefore, in S340 the status monitor 11A sets again the checking interval for the printer 2D at "2 days."

However, in this example, the printer 2E is at this time deemed a printer from which firmware data has been successfully acquired with low frequency, due to a continued failure to acquire firmware data from the printer 2E. Therefore, in S340 the status monitor 11A changes the checking interval to "60 days."

As a result, the checking interval for each of the printers 2A-2E is now set to the number of days shown in FIG. 7(c). As described earlier, the status monitor 11A also updates the previous check date for all of the printers 2A-2E to the current date, regardless of whether firmware data is successfully acquired from the printers.

Since the status monitor 11A modifies only the previous check date and not the checking interval for the printers 2A and 2C, the timing at which the status monitor 11A checks for updates for these printers 2A and 2C is extended slightly from the initial setting. However, this small delay in checking does not pose any particular problems.

When the current date subsequently becomes "9/7/2008", the status monitor 11A reaches a positive determination in S210 for the printer 2D. In this case, the method of updating data in the dataset for the printer 2D depends on whether the acquisition of firmware data is succeeded or failed.

First, the update process will be described for a case in which the status monitor 11A has failed to acquire firmware data from the printer 2D. Since the cumulative number of printers from which firmware data has been successfully acquired remains at two in this case, the status monitor 11A again reaches a negative determination in S305 because firmware data has not been acquired from three or more printers.

In this example, it will be assumed at this point that the printer 2D is also a printer from which firmware data has been successfully acquired with low frequency, due to a continued failure to acquire firmware data from the printer 2D. Therefore, in S340 the status monitor 11A changes the checking interval for the printer 2D to "60 days." In other words, when firmware data cannot be acquired from a printer over a continuous period of time, the status monitor 11A changes the checking interval for the printer 2D from the default "30 days" to a longer period of "60 days."

As a result of the above process, the checking interval for each of the printers 2A-2E has been changed to the number of days shown in FIG. 7(d). As described earlier, the status monitor 11A also updates the previous check date for all of the printers 2A-2E to the current date, regardless of whether firmware data is successfully acquired from these printers.

Since the status monitor 11A changes only the previous check date and not the checking interval for the printers 2A, 2B, 2C, and 2E, the timing at which the status monitor 11A checks for updates for these printers is extended slightly from the initial setting. However, this small delay in checking does not pose any particular problems.

However, if the status monitor 11A succeeds in acquiring firmware data from the printer 2D after the checking intervals for the printers have been changed to the days shown in FIG. 7(c), in this case the cumulative number of printers from which firmware data has been successfully acquired reaches three and, thus, the status monitor 11A reaches a positive determination in S305. At this time, the cumulative number of printers from which firmware data has been successfully acquired is reset to zero, and in S310 the status monitor 11A modifies the checking interval for all of the printers 2A-2E to "30 days."

In other words, the checking interval for all the printers 2A-2E is now set to the number of days shown in FIG. 7(e). As described earlier, the status monitor 11A also updates the previous check date for all of the printers 2A-2E to the current date, regardless of whether firmware data is successfully acquired from these printers.

As described above, the checking interval is normally set to the default "30 days" for a printer when firmware data is successfully acquired from that printer. When the status monitor 11A fails to acquire firmware data from a printer, the checking interval is changed from the default "30 days" to a shorter period of "2 days" when the history shows that the status monitor 11A has succeeded in acquiring firmware data from that printer with high frequency, but is changed from the default "30 days" to a longer period of "60 days" when the history shows that the status monitor 11A has succeeded in acquiring firmware data from that printer with low frequency.

According to this process, the status monitor 11A quickly reattempts to acquire firmware data from a printer after a failure if the status monitor 11A has had good success acquiring firmware data from that printer in the past, enabling the PC 1 to notify the user of any available updates as soon as possible. Further, if the success rate for acquiring firmware data from a printer is low, the status monitor 11A does not unnecessarily increase the frequency of attempts for acquiring firmware data from this printer so as to avoid applying an excessive load on the PC 1.

Further, when the status monitor 11A determines that the prescribed condition is met, e.g., when the status monitor 11A has acquired firmware data from three or more printers in the above example, the status monitor 11A uniformly updates the checking interval for all printers 2A-2E to the default "30 days." In this way, once the status monitor 11A has acquired firmware data from a specific number of printers, the status monitor 11A can temporarily reset the checking intervals for all printers to eliminate the above variations; namely, "2 days," "30 days," and "60 days." In this way, the status monitor 11A can synchronize the timing for queries to the server 3 to reduce the frequency at which queries are issued to the server 3, thereby reducing the load on the server 3.

EFFECT OF THE INVENTION

With the peripheral device management system 100 described above, the PC 1 determines at prescribed intervals whether newer firmware than the firmware installed on the printers 2A-2E can be downloaded from the server 3. When newer firmware is available, the PC 1 notifies the user that the firmware can be downloaded so the user can detect when firmware updates are available.

Specifically, in S210 PC 1 determines whether a time for checking has come. In S215 the PC 1 attempts to acquire firmware data from each of printers for which in S205 the PC 1 determines that the confirmation time has come. Through the steps S240-S250, the PC 1 confirms, to the server 3, whether a newer firmware than the firmware installed on the printer is available for downloading from the server 3 if the PC 1 successfully acquires the firmware data in S220. In S255 PC 1 notifies that the newer firmware is available for downloading from the server 3 if a result of the confirmation in the S240 is affirmative.

In S310 PC 1 sets a reference time for checking if a result of the step S215 satisfies a prescribed condition (S305: YES). That is, the PC 1 sets the interval for performing the next check for updates to 30 days.

In S340, the PC 1 sets the time for checking that precedes the reference time if the result of the step S215 does not satisfy the prescribed condition (S305: No) and if the firmware data has been acquired with a frequency higher than a reference value based on the history. The PC 1 sets a time for checking that follows the first confirmation time if the result of the step S215 does not satisfy the prescribed condition (S305: NO) and if the firmware data has been acquired with a frequency equal to or lower than the reference value.

That is, the PC 1 sets the next checking interval for a printer to "30 days" when the acquisition status for firmware data meets a predetermined condition, and sets the next checking interval to a shorter interval than "30 days" ("2 days" in the embodiment) when the acquisition status does not meet the predetermined condition.

Hence, the PC 1 rechecks for updates at a shorter interval when the acquisition status for updates does not meet the predetermined condition, rather than simply constantly checking at intervals of "30 days." Accordingly, the PC 1 can more quickly notify the user of updates without waiting an excessively long period to recheck.

Further, rather than simply constantly checking for updates every 2 days, the PC 1 can avoid setting the next checking interval to an excessively short interval, regardless of whether the acquisition status meets the predetermined condition. Hence, the PC 1 does not apply an excessive load to the server 3 and the networks (the LAN 5 and the WAN 7).

Further, by transmitting the firmware data acquired from the printers 2A-2E to the server 3 in S240, the PC 1 allows the server 3 to determine whether new firmware can be transmitted to the PC 1. The PC 1 acquires the results of this determination from the server 3 in S245 and determines in S250 whether new firmware can be downloaded from the server 3.

In other words, in S240 the PC 1 sends information based on the firmware data acquired from the printer 2A-2E to the server 3 so that the server 3 is capable of determining whether the firmware retained in the server is available as the newer firmware. The PC 1 receives a result of the determination made by the server 3 regarding the firmware retained in the server 3. That is, in S250 the PC 1 confirms, based on the result of the determination received from the server 3, whether the newer firmware than the firmware installed on the printer is available for downloading from the server 3.

Hence, this configuration can lighten the load of the PC 1 because the PC 1 needs not determine whether there exists any new firmware versions to be downloaded by acquiring all data from the server 3 related to firmware that the server 3 can supply.

Further, when the connection status of any of the printers 2A-2E is determined to have changed to "online" in S115, the PC 1 can determine in S120 whether new firmware can be downloaded from the server 3 for this printer. That is, the PC 1 sets preliminarily at least one preselected printer, as monitored printer, among the plurality of printers 2A-2E. The PC 1 detects that one of the at least one preselected printer (monitored printer) becomes online. The PC 1 executes S105 after in S115 the PC 1 detects that the one of the at least one preselected printer (monitored printer) becomes online.

If new firmware is available for downloading, in S255 the PC 1 notifies the user of the available update.

Therefore, if the PC 1 is unable to confirm whether firmware is available for download due to the connection status of the printers 2A-2E being offline, the PC 1 can quickly check for updates for a printer when triggered by a change in the connection status of the printer to "online."

Through S320-S340 the PC 1 sets the checking interval for each of the printers 2A-2E, even though the acquisition status does not meet the predetermined condition. Subsequently, in S215 and S220 the PC 1 acquires firmware data only from those printers whose checking interval has elapsed. Since the PC 1 can acquire data more effectively than when attempting to acquire data from all of the printers 2A-2E all of the time, this method reduces the load on the PC 1.

Further, in S340 the PC 1 can accelerate the timing at which the PC 1 checks for updates after determining in S305 that the PC 1 cannot obtain firmware data from at least a prescribed number (three in the embodiment) of printers. Hence, when the PC 1 cannot acquire firmware data from a large number of printers, the PC 1 reattempts after a shorter interval to check whether downloadable firmware exists. That is, the PC 1 sets the time for checking for each of the plurality of printers from which the PC 1 cannot acquire the firmware data, based on the history of the each of the plurality of printers 2A-2E regarding the result of the step S215.

Further, the PC 1 can set a threshold value to the number of instances of firmware data (three in the above example) that the PC 1 can normally acquire with high probability and can hasten the timing for the next check for updates when unable to acquire firmware data from a number of printers equal to or greater than the threshold value.

Therefore, even if the PC 1 happens to fail in acquiring firmware data from a printer that the PC 1 normally can acquire firmware data from with high probability, the next opportunity to check for updates arrives more quickly, enabling the PC 1 to reattempt to check for the existence of downloadable firmware more quickly.

When the PC 1 is unable to acquire firmware data from a predetermined specific device, the PC 1 can accelerate the timing at which the next check is performed by setting the checking interval to "2 days" for the peripheral device when firmware data could be acquired from the peripheral device with high frequency in the past. Conversely, the PC 1 can delay the timing to check for updates for a peripheral device when firmware data has been acquired infrequently from this peripheral device in the past by setting the checking interval to "60 days." Thus, the PC 1 does not excessively check for updates for peripheral devices that are rarely used, reducing the load on the PC 1.

[Modifications]

While the invention has been described in detail with reference to the embodiments thereof, it would be apparent to those skilled in the art that various changes and modifications may be made therein without departing from the spirit of the invention.

For example, in S340 of the embodiment described above, the PC 1 divides printers into two categories—those from which data has been successfully acquired with high frequency and those from which data has been successfully acquired with low frequency—and sets the next interval to check for updates to 2 days or 60 days based on this category. However, three or more categories may be used for the frequency at which data is successfully acquired from printers, and the next checking interval may be set to different numbers of days (i.e., numbers other than 2 and 60) based on these categories. The numbers of days for the next checking interval may be set to preferred numbers that account for the processing load applied to the PC 1 and the server 3.

Further, when the PC 1 is able to acquire firmware data from three or more printers, in S305 of the embodiment described above, the PC 1 determines that the acquisition state meets the prescribed condition, but the prescribed condition in the embodiment is merely an example, and the invention is not limited to this condition.

For example, the prescribed condition may be met when the PC 1 can acquire firmware data from printers specifically set in the PC 1 as normally-used printers (default printers). That is, the prescribed condition is to acquire the firmware from a predetermined printer. In this case, the PC 1 can accelerate the timing at which the next check is performed when the PC 1 is capable of acquiring firmware data from these predetermined specific printers.

Therefore, the PC 1 can more quickly reattempt to check whether downloadable firmware exists for the default printers that are particularly important to the user.

Further, in the embodiment described above, the prescribed number used in S305 is set to the number of printers from which data has been successfully acquired with the highest frequency based on the past history for data acquisition. In the example of the embodiment, this number is "3". However, the prescribed number may instead be set to a threshold value that is unrelated to the past history of data acquisition.

For example, the PC 1 may also determine that the acquisition status meets the prescribed condition when able to acquire firmware data from a majority of the printers in the system. Alternatively, the PC 1 may determine that the acquisition status meets the prescribed condition when able to acquire firmware data from a percentage of all printers, such as several tens of percent or greater, rather than a majority.

Alternatively, if there are different types of printers in the system, the PC 1 may determine that the acquisition status meets the prescribed condition when able to acquire firmware data from at least one printer among each type, for example.

While printers have been used as an example of the peripheral devices in the embodiment described above, the structure of the invention may be applied to peripheral devices other than printers and is capable of notifying the user when the firmware of the peripheral devices can be updated.

Some specific examples of peripheral devices other than printers are a facsimile machine, a printing device in a multifunction peripheral (MFP), a scanner, a network, camera, an image-inputting device of an MFP, an image-communicating device in the facsimile machine or the MFP described above, a communication routing device such as a network router or a network access point, and a data storage device such as a network-attached storage unit.

In the embodiment described above, the PC 1 is configured to notify the user when firmware for a peripheral device can be updated. However, the PC 1 may employ a combination of configurations for downloading firmware when updates are available and for applying the downloaded firmware to the corresponding peripheral device based on the user's settings.

What is claimed is:

1. A computer-readable storage medium storing a set of program instructions executable on a data processing device, the program instructions comprising:
   (a) determining whether a confirmation time has come, the confirmation time being a time to attempt to acquire firmware data;
   (b) attempting to acquire, from each of a plurality of peripheral devices, the firmware data that specifies firmware installed on the each of the plurality of peripheral devices if a result of the determination made in the determining instruction (a) is affirmative;
   (c) confirming, to a server, whether, if the attempting instruction (b) successfully acquires the firmware data from at least one peripheral device among the plurality of peripheral devices, a newer firmware for one of the at least one peripheral device than the firmware installed on the one of the at least one peripheral device is available for downloading from the server;
   (d) notifying that the newer firmware is available for downloading from the server if a result of the confirmation made in the confirmation instruction (c) is affirmative;
   (e) setting a first confirmation time as the confirmation time for all of the plurality of peripheral devices if an acquisition result of the attempting instruction (b) from each of the plurality of peripheral devices satisfies a prescribed condition; and
   (f) setting, if the acquisition result of the attempting instruction (b) from each of the plurality of peripheral devices does not satisfy the prescribed condition, a second confirmation time that is different from the first confirmation time as the confirmation time for one or more peripheral devices from which the attempting instruction does not acquire the firmware data.

2. The computer-readable storage medium according to claim 1, wherein the confirming instruction (c) includes:
   (g) sending information based on the firmware data acquired from at least one of the plurality of peripheral devices to the server so that the server is capable of determining whether the firmware retained in the server is available as the newer firmware;
   (h) receiving a result of the determination made by the server regarding the firmware retained in the server; and
   (i) confirming, based on the result of the determination received from the server, whether the newer firmware than the firmware installed on one of the plurality of peripheral devices is available for downloading from the server.

3. The computer-readable storage medium according to claim 2, wherein at least one peripheral device is preselected among the plurality of peripheral devices, the program instructions further comprising (j) detecting that one of the at least one peripheral device becomes online,
   wherein the determining instruction (a) is executed after the detecting instruction (j) detects that the one of the at least one peripheral device becomes online.

4. The computer-readable storage medium according to claim 1,
   wherein the setting instruction (t) sets, as the confirmation time, a second confirmation time for the one or more peripheral devices from which the attempting instruction (b) does not acquire the firmware data among the plurality of the peripheral devices based on a history of the each of the plurality of peripheral devices regarding an acquisition result of the attempting instruction (b),
   wherein the determining instruction (a) determines a confirmation time for each of the plurality of peripheral devices,
   wherein the attempting instruction (b) attempts to acquire firmware data from each of peripheral devices for which the determining instruction (a) determines that the confirmation time has come.

5. The computer-readable storage medium according to claim 1,
   wherein the determining instruction (a) determines a confirmation time for each of the plurality of peripheral devices,
   wherein the attempting instruction (b) attempts to acquire firmware data from each of peripheral devices for which the determining instruction (a) determines that the confirmation time has come,
   wherein the prescribed condition is to acquire firmware data from a prescribed number of peripheral devices.

6. The computer-readable storage medium according to claim 5, wherein the prescribed number is set to a number of peripheral devices from which firmware data has most frequently acquired in one execution of the attempting instruction (b) that attempts to acquire the firmware data from each of the plurality of peripheral devices.

7. The computer-readable storage medium according to claim 1, wherein the prescribed condition is to acquire the firmware data from a predetermined peripheral device.

8. The computer-readable storage medium according to claim 1,
   wherein the setting instruction (f) sets the second confirmation time that precedes the first confirmation time as the confirmation time if the acquisition result of the attempting instruction (b) from each of the plurality of peripheral devices does not satisfy the prescribed condition and if the firmware data has been acquired with a frequency higher than a reference value;
   the program instructions further comprising (k) setting a third confirmation time that follows the first confirmation time if the acquisition result of the attempting instruction (b) from each of the plurality of peripheral devices does not satisfy the prescribed condition and if the firmware data has been acquired with a frequency equal to or lower than the reference value.

9. A data processing device comprising:
   a determining unit that determines whether a confirmation time has come, the confirmation time being a time to attempt to acquire firmware data;
   an attempting unit that attempts to acquire, from each of a plurality of peripheral devices, the firmware data that specifies firmware installed on the peripheral device if a result of the determination made by the determining unit is affirmative;
   a confirming unit that confirms, to a server, whether, if the attempting unit successfully acquires the firmware data from at least one peripheral device among the plurality of peripheral devices, a newer firmware for one of the at least one peripheral device than the firmware installed on the one of at least one peripheral device is available for downloading from the server;
   a notifying unit that notifies that the newer firmware is available for downloading from the server if a result of the confirmation made by the confirmation unit is affirmative;
   a first setting unit that sets a first confirmation time as the confirmation time for all of the plurality of peripheral devices if an acquisition result of the attempting unit from each of the plurality of peripheral devices satisfies a prescribed condition; and
   a second setting unit that sets, if the acquisition result of the attempting unit from each of the plurality of peripheral devices does not satisfy the prescribed condition, a second confirmation time that is different from the first confirmation time as the confirmation time for one or more peripheral devices from which the attempting unit does not acquire the firmware data.

10. A method for controlling a data processing device, the method comprising steps of:
    (a) determining whether a confirmation time has come, the confirmation time being a time to attempt to acquire firmware data;
    (b) attempting to acquire, from each of a plurality of peripheral devices, the firmware data that specifies firmware installed on the each of the plurality of peripheral devices if a result of the determination made in the determining step (a) is affirmative;
    (c) confirming, to a server, whether, if the attempting step (b) successfully acquires the firmware data from at least one peripheral device among the plurality of peripheral devices, a newer firmware for one of the at least one peripheral device than the firmware installed on the one of the at least one peripheral device is available for downloading from the server;
    (d) notifying that the newer firmware is available for downloading from the server if a result of the confirmation made in the confirmation step (c) is affirmative;
    (e) setting a first confirmation time as the confirmation time for all of the plurality of peripheral devices if an acquisition result of the attempting step (b) from each of the plurality of peripheral devices satisfies a prescribed condition; and (f) setting, if the acquisition result of the attempting step (b) from each of the plurality of peripheral devices does not satisfy the prescribed condition, a second confirmation time that is different from the first confirmation time as the confirmation time for one or more peripheral devices from which the attempting step (b) does not acquire the firmware data.

11. The method according to claim 10, wherein the confirming step (c) includes:

(g) sending information based on the firmware data acquired from at least one of the plurality of peripheral devices to the server so that the server is capable of determining whether the firmware retained in the server is available as the newer firmware;

(h) receiving a result of the determination made by the server regarding the firmware retained in the server; and (i) confirming, based on the result of the determination received from the server, whether the newer firmware than the firmware installed on one of the plurality of peripheral devices is available for downloading from the server.

12. The method according to claim 11, wherein at least one peripheral device is preselected among the plurality of peripheral devices, the method further comprising steps of (j) detecting that one of the at least one peripheral device becomes online, wherein the determining step (a) is executed after the detecting step (j) detects that the one of the at least one peripheral device becomes online.

13. The method according to claim 10, wherein the setting step (f) sets, as the confirmation time, a second confirmation time for the one or more peripheral devices from which the attempting step (b) does not acquire the firmware data among the plurality of the peripheral devices based on a history of the each of the plurality of peripheral devices regarding an acquisition result of the attempting step (b), wherein the determining step (a) determines a confirmation time for each of the plurality of peripheral devices, wherein the attempting step (b) attempts to acquire firmware data from each of peripheral devices for which the determining step (a) determines that the confirmation time has come.

14. The method according to claim 10, wherein the determining step (a) determines a confirmation time for each of the plurality of peripheral devices, wherein the attempting step (b) attempts to acquire firmware data from each of peripheral devices for which the determining step (a) determines that the confirmation time has come, wherein the prescribed condition is to acquire firmware data from a prescribed number of peripheral devices.

15. The method according to claim 14, wherein the prescribed number is set to a number of peripheral devices from which firmware data has most frequently acquired in one execution of the attempting step (b) that attempts to acquire the firmware data from each of the plurality of peripheral devices.

16. The method according to claim 10, wherein the prescribed condition is to acquire the firmware from a predetermined peripheral device.

17. The method according to claim 10, wherein the setting step (f) sets the second confirmation time that precedes the first confirmation time as the confirmation time if the acquisition result of the attempting step (b) from each of the plurality of peripheral devices does not satisfy the prescribed condition and if the firmware data has been acquired with a frequency higher than a reference value;

the method further comprising a step of (k) setting a third confirmation time that follows the first confirmation time if the acquisition result of the attempting step (b) from each of the plurality of peripheral devices does not satisfy the prescribed condition and if the firmware data has been acquired with a frequency equal to or lower than the reference value.

* * * * *